G. E. BARSTOW.
CTRIC HEATING AND BENDING DEVICE.
APPLICATION FILED AUG. 20, 1918.

1,332,658.

Patented Mar. 2, 1920.
4 SHEETS—SHEET 1.

Inventor
George E. Barstow
By his Attorneys
Townsend & Decker

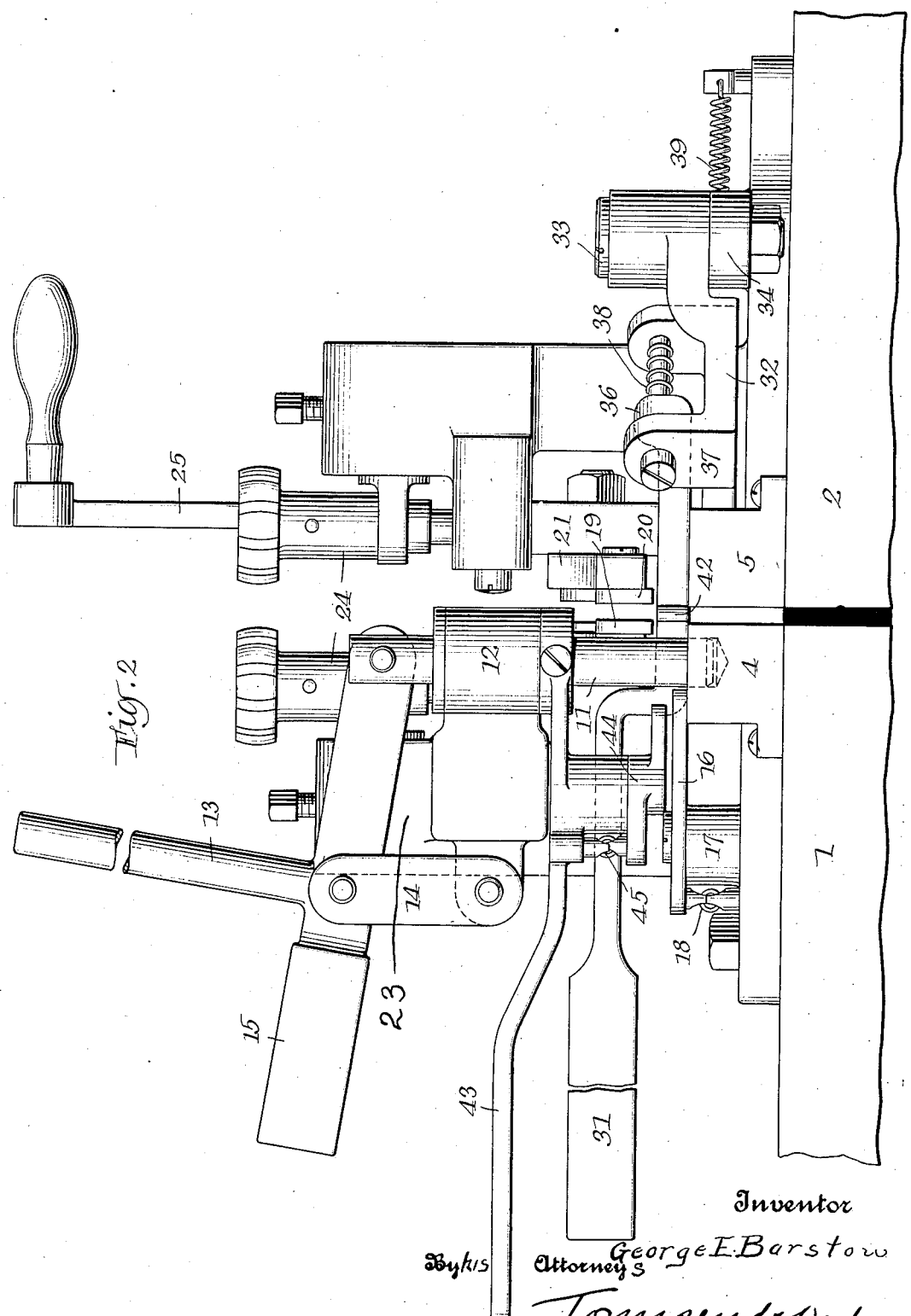

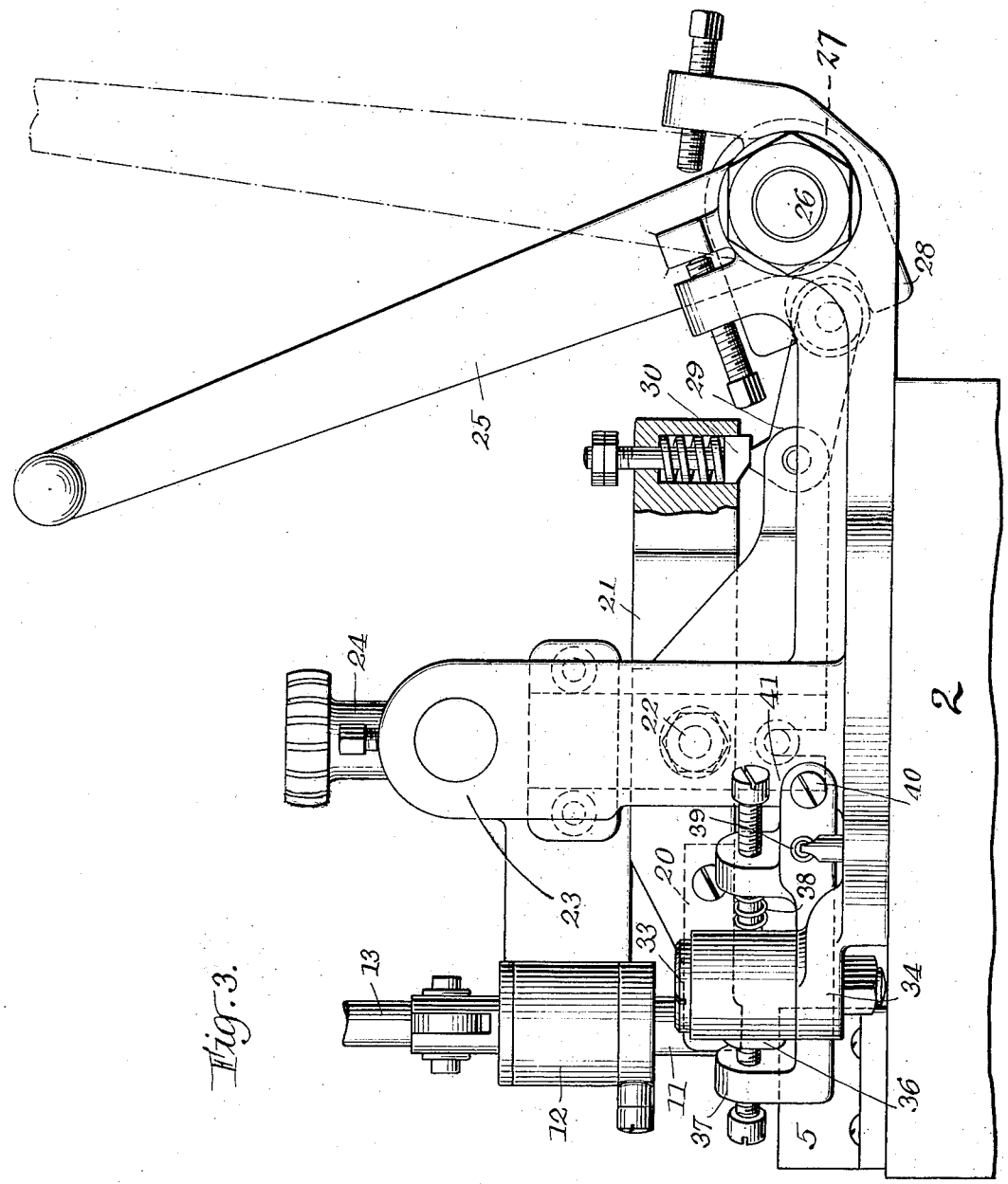

G. E. BARSTOW.
ELECTRIC HEATING AND BENDING DEVICE.
APPLICATION FILED AUG. 20, 1918.
1,332,658.
Patented Mar. 2, 1920.
4 SHEETS—SHEET 4.
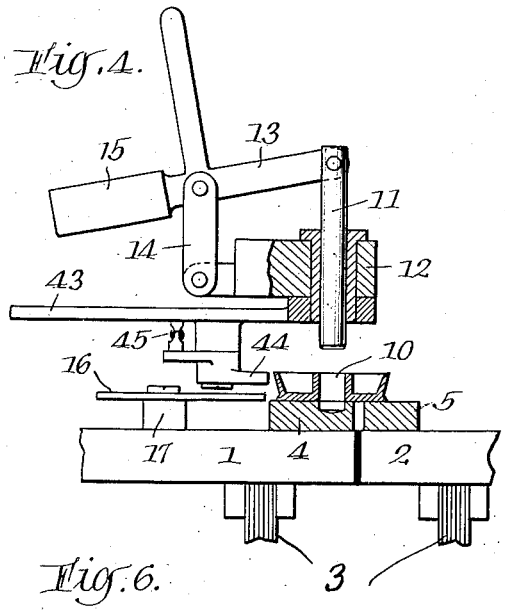
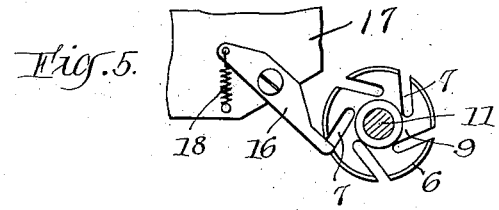
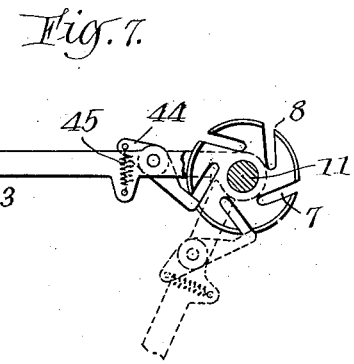
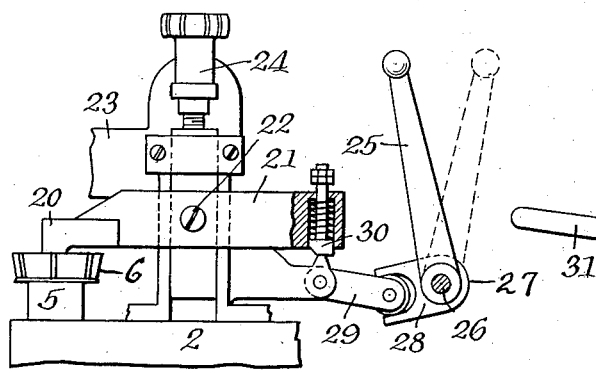
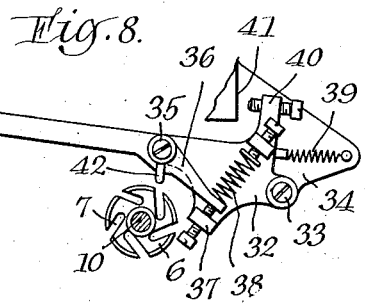
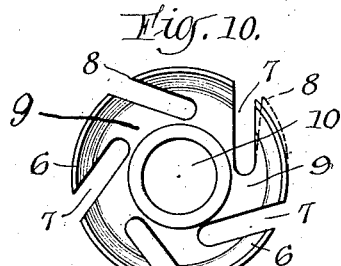
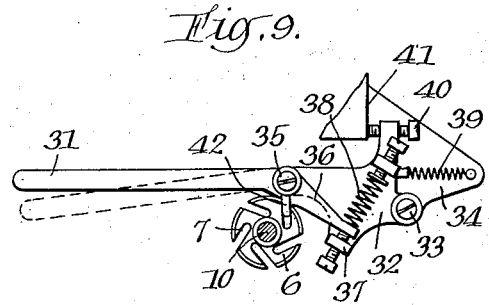
Inventor
George E. Barstow.
By his Attorneys.
Townsend & Decker

UNITED STATES PATENT OFFICE.

GEORGE E. BARSTOW, OF LYNN, MASSACHUSETTS, ASSIGNOR TO THOMSON ELECTRIC WELDING COMPANY, OF LYNN, MASSACHUSETTS, A CORPORATION OF MASSACHUSETTS.

ELECTRIC HEATING AND BENDING DEVICE.

1,332,658.   Specification of Letters Patent.   Patented Mar. 2, 1920.

Application filed August 20, 1918. Serial No. 250,665.

*To all whom it may concern:*

Be it known that I, GEORGE E. BARSTOW, a citizen of the United States, and a resident of Lynn, in the county of Essex and State of Massachusetts, have invented certain new and useful Improvements in Electric Heating and Bending Devices, of which the following is a specification.

My present invention relates to heating and bending apparatus in which electric current derived from an electric heating transformer is used as the heating medium.

The invention is particularly useful for bending the points or cutting edges of rotary cutters such as used for trimming heels in shoe manufacture and will be described as applied to this use although it will be understood that the invention is not limited to any particular application of it. In making cutters for the above purpose the cutter is turned up in a lathe and notches running from the periphery toward the center of the cutter are milled leaving a plurality of teeth around the periphery. The outer edges of these teeth form cutting edges or points which it is necessary to spring out to give them cutting clearness over the periphery of the cutter. In order to effect this the tooth is bent at the neck which connects it with the body of the cutter whereby the cutting edge or point is flared out from normal.

On account of the high carbon steel used for these cutters it is not advisable to do the bending cold, and to heat the whole cutter in a furnace is slow and expensive and likely to cause a distortion other than that desired.

The object of the present invention is to heat the cutter by means of an electric current locally at the part at which it is desired to bend it and to provide means for easily and quickly bending it at such place whereby it is only necessary to heat the neck of each tooth and the degree of this heat is in perfect control and can be utilized immediately with a minimum expenditure of energy.

The invention consists in the apparatus or device for electrically heating and bending hereinafter more particularly described and then specified in the claims.

In the accompanying drawings, Figure 1 is a plan view of an apparatus constructed and arranged in accordance with this invention when constructed for bending heel trimming cutters.

Fig. 2 is a front elevation of the same.

Fig. 3 is a side elevation.

Fig. 4 is a reduced side elevation of the centering device for the cutter detached from the apparatus for clearness.

Fig. 5 is a plan view of the positioning and holding device.

Fig. 6 is a side elevation illustrating one of the clamps for holding the cutter.

Fig. 7 is a plan view of the rotating or feeding device.

Fig. 8 is a plan view of the bending device in initial position.

Fig. 9 is a plan view of the bending device in a subsequent position.

Figure 1:
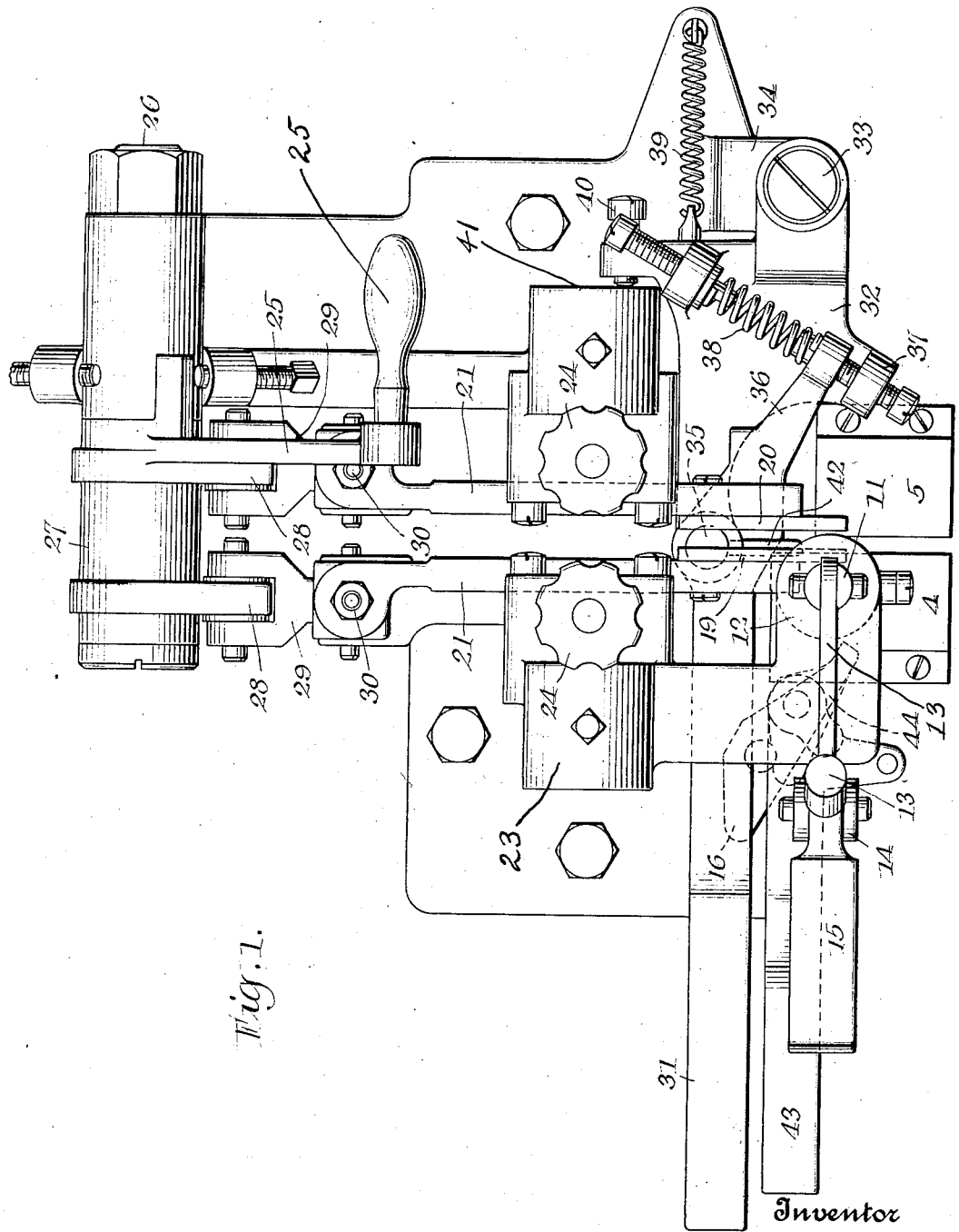

Figs. 4 to 9 inclusive are shown on a reduced scale from that used in Figs. 1 to 3 and are each shown separately from the rest of the apparatus for clearness of illustration and understanding.

Fig. 10 is a plan view of the form of cutter for which the apparatus illustrated is particularly constructed.

Fig. 11 is a side elevation and partial section of the same.

The heating current is supplied from the secondary of an electric transformer, the primary circuit of which is connected to line wires as is usual and well understood in the electric heating and welding art and no detailed description or illustration of this part of the apparatus is deemed necessary.

The parts of the apparatus are mounted on and supported by a table or platform mounted on suitable legs or frame work (not shown). 1 and 2 indicate terminal blocks or platens to which the ends of the transformer secondary 3 are secured in any suitable manner. The platens are secured to the table in any desired manner—this forming no part of the present invention and such mounting is well known in the art. The terminal blocks derive electric heating current from the transformer (not shown) through the connection with the secondary in a manner well known in the art. The terminal blocks 1 and 2 are insulated from each other and each is provided with a work holding electrode 4, 5 respectively. The electrodes 4 and 5 are preferably flat copper blocks spaced apart in line with the gap in the transformer secondary and upon the upper surface of said electrodes or blocks the work, bridging the gap between the electrodes, seats.

The particular work for which the apparatus illustrated is designed is a cutter for shoe machinery used for trimming heels. The form of this cutter is clearly illustrated in Figs. 10 and 11 and it consists of an annular trough-shaped body having a number of teeth 6 formed by cutting notches 7 inward from the periphery as shown. Each tooth 6 has a cutting edge 8 and the tooth is connected with the body of the cutter by a neck or base 9. The cutting edge or point must be bent or distorted outward as indicated in dotted lines in Fig. 10 in relation to the body of the cutter in order to give the necessary clearance. The cutter is also provided with a central perforation 10.

11 indicates a centering pin vertically and reciprocally mounted in a bracket 12 projecting from a standard 23 secured to the table or platform. The pin is reciprocated to and from the electrode block 4 by means of an elbow lever 13 pivoted to the upper end of the pin and fulcrumed by means of a link 14 pivotally supported on the bracket 12. This lever is so balanced by means of weight 15 as to allow the pin 11 to stay in either the up or the down position as desired.

The pin 11 fits closely in the perforation 10 of the cutter when the cutter is placed on the electrodes 4, 5 and the pin is depressed. It also preferably goes clear through the perforation and into a recess in the upper surface of the block 4. The pin 11 thus acts as a centering device for positioning the cutter bodily on the electrode blocks 4 and 5.

To assure the annular position of the cutter about the pin 11 to bring the neck 9 in position spanning the gap between the electrodes 4 and 5, a combined positioning and locking or holding pawl 16 is provided (Figs. 4 and 5). The pawl is pivotally mounted on a bracket 17 supported on the platen 1. The end of the pawl 16 bears against the side of a notch 7 in the cutter and when in this position one of the necks 9 is in position spanning the gap between the electrodes. A spring 18 maintains the pawl pressed against the periphery of the cutter.

Any suitable clamping device for holding the cutter pressed against the electrodes 4 and 5 during the heating period may be employed. By preference I use a pair of clamping blocks 19, 20 both disposed at one side of the pin 11 and one on each side of the gap between the electrodes. The clamps engage the upper part of the cutter and press its lower surface firmly against its seat on both the electrodes to insure a good electrical contact between the parts.

Each clamping block is provided with a lever 21 to one end of which the block is secured. Each lever is fulcrumed at 22 to the standard 23 rising from the table and is provided with an adjusting device 24 to regulate the vertical position of the lever.

25 indicates a clamping lever located at the rear of the table and pivoted on a shaft 26. Said clamping lever is common to both clamp blocks 19 and 20 and by rocking a sleeve 27 on the shaft 26 raises the rear ends of the clamp carrying levers 21 and depresses the clamps 19 and 20 onto the work. The rocking motion of the sleeve 27 is translated into a motion for raising the rear end of the levers 21 by forks 28, cam levers 29 and spring-backed cam bolts 30. Upon rocking the sleeve in the reverse direction the clamps open automatically due to gravity acting on the rear ends of the levers 21.

After clamping the cutter in position the current is turned on in any suitable manner and flowing from the electrode 5 to the electrode 4 through the neck 9 of the cutter, heats this part of the cutter locally.

31 indicates the handle end of a two-part lever or bending device, the fulcrum end being indicated at 32. The lever as a whole is pivoted at 33 to a bracket 34 secured to the platen 2. The two parts of the lever are joined by a pivot at 35. The handle part 31 of the lever is provided with an arm 36 which is normally pressed against a stop 37 on the lever part 32 by a strong spring 38. 39 indicates a spring, weaker than the spring 38, which normally keeps the lever as a whole in inoperative position.

Upon swinging the handle 31 the lever as a whole turns about the pivot 33 until an adjustable stop screw 40 carried by the part 32 butts against a fixed stop or abutment 41 on the bracket 34; the spring 38 in the meantime, being stronger than the spring 39, keeps the two parts of the lever in rigid relation. At the time the stop screw 40 strikes the abutment 41 a bending projection or dog 42 carried by the handle part of the lever engages the cutting edge or point of a tooth of the cutter. The dog 42 preferably engages the cutting edge at or near the bottom so as to apply the bending force in substantial line with the heated section.

Upon further movement of the lever handle 31, said handle turns about the pivot 35 and causes the projection or dog 42 to bend or distort the edge or point of the cutter outward, the tooth bending at the heated neck 9; the spring 38 being compressed during this movement. Upon release of the handle 31 the lever as to its parts and as a whole returns to its normal position due to springs 38 and 39.

43 indicates a feeding lever for rotating the cutter about the pin 11 to feed a new point in position to be operated on. The lever 43 is pivotally supported on the bracket 12 and carries a pawl 44 pivoted to the underside thereof, said pawl being pressed against the periphery of the cutter by a spring 45. The end of the pawl engages the side of a notch 7 of the cutter above the positioning pawl 16 and on swinging the lever 43 the cutter is rotated by means of the pawl 44 to bring another tooth in operative position. Normally the feeding pawl 43 is directly below and coincides with the positioning and locking pawl 16.

The operation of the apparatus is as follows: After the cutter has been placed in position on the electrode blocks 4 and 5, (see Fig. 4) the centering pin 11 is pushed into its central perforation 10 by means of the lever 13. The cutter is then rotated until the positioning and locking pawl 16 engages the side of a notch 7 as shown in Fig. 5 at which time the neck 9 of a tooth spans the gap between the electrodes.

The clamps 19 and 20 are then brought down onto the cutter by the lever 25 and the cutter is pressed in firm contact on the electrodes. The current is now turned on and due to it spanning the gap between the electrodes the neck 9 is heated locally until sufficiently soft to allow of bending it without injury.

After the neck has become sufficiently heated, the bending lever 31 is drawn forward from the position shown in Fig. 8, to that shown in full lines in Fig. 9, the lever swinging about the pivot 33 as previously described until the stop screw 40 engages the stop 41 at which time the projection 42 has entered the notch 9 in the cutter far enough to engage the cutter point or edge. The current is then turned off and the clamps 19 and 20 are withdrawn.

The bending lever is then pulled forward to the dotted position shown in Fig. 9. As the stop screw 40 is against its stop the lever handle swings about the pivot 35 causing the bending piece or projection 42 to push the cutting point or edge outward into the position shown in dotted lines in Fig. 11. The lever 31 is then returned to the position shown in Fig. 8. During the bending operation the locking pawl 16 opposes any tendency of the cutter to rotate due to the application of the force necessary to bend the cutter point outward.

The feeding lever 43 is now swung to the dotted position shown in Fig. 6 thus bringing a new point of the cutter in position for bending.

The above operation is repeated until all the points or cutting edges of the cutter have been bent or distorted outward after which the centering pin 11 is raised by means of the lever 13 and the cutter is removed and the apparatus is ready for insertion of a new cutter.

It will be understood that my invention is not limited to the details of construction or combinations of parts hereinbefore described except as may be specified in the appended claims.

What I claim as my invention is:—

1. In an electric heating and bending apparatus, the combination with current supplying blocks or electrodes, means for clamping the work on said electrodes with the part to be heated spanning the gap therebetween and means engaging a part of the work for bending said part without disturbing the position of the work as a whole.

2. In an electric heating and bending apparatus, the combination with current supplying blocks or electrodes, means for clamping the work on said electrodes with the part to be heated spanning the gap therebetween, means for holding the work in position after release from the clamping means and independent means engaging a part of the work for bending said part.

3. In an electric heating and bending apparatus, the combination with current supplying blocks or electrodes, means for clamping the work on said electrodes with the part to be heated spanning the gap therebetween, means engaging a part of the work for bending said part and means for rotating the work on said electrodes to bring the next part in position to be acted on.

4. In an electric heating and bending apparatus, the combination with current supplying blocks or electrodes, means for clamping the work on said electrodes with the part to be heated spanning the gap therebetween, means for holding the work in position after release from the clamping means, means engaging a part of the work for bending said part and means for rotating the work on said electrodes to bring the next part in position to be acted on.

5. In an electric heating and bending apparatus, the combination with current supplying blocks or electrodes, means for holding the work in position with the part to be heated spanning the gap between the electrodes and means engaging a part of the work for bending the same at the heated section without disturbing the position of the work as a whole.

6. In an electric heating and bending apparatus, the combination with current supplying blocks or electrodes, means for locating the work on said electrodes and means engaging a part of the work for bending it at the heated section without disturbing the position of the work as a whole.

7. In an electric heating and bending apparatus, the combination with current supplying blocks or electrodes, means for locating the work on said electrodes, means engaging a part of the work for bending it at the heated section and means for rotating the work to bring the next part in position to be acted on.

8. In an electric heating and bending apparatus, the combination with current supplying blocks or electrodes on which the work is seated, a centering device for the work, means engaging the periphery of the work for bending it at the heated section and means for rotating the work about said centering device to bring a different part into position to be acted on.

9. In an electric heating and bending apparatus, the combination with current supplying blocks or electrodes, means for locating the work on said electrodes, means for clamping the work on said electrodes and means engaging a part of the work for bending it at the heated section.

10. In an electric heating and bending apparatus, the combination with current supplying blocks or electrodes, means for locating the work on said electrodes, means for clamping the work on said electrodes, means for holding the work after release from the clamping means and means engaging a part of the work for bending it at the heated section.

11. In an electric heating and bending apparatus for rotary cutters, the combination with coöperating electrodes for supplying heating electric current to the cutter, means for holding the cutter in position with respect to said electrodes and means engaging a cutting edge of said cutter to bend it at the heated part.

12. In an electric heating and bending apparatus for rotary cutters, the combination with coöperating electrodes for supplying heating electric current to the cutter, means for holding the cutter in position with respect to said electrodes and a lever adapted to engage a cutting edge of said cutter and bend it at the heated part of the cutter.

13. In an electric heating and bending apparatus for rotary cutters, the combination with coöperating electrodes for supplying heating electric current to the cutter, means for clamping the work on said electrodes, means for holding the work in position after release from the clamps and a lever adapted to enter a notch in the periphery of the cutter and bend a cutting edge with respect to the body of the cutter.

14. In an electric heating and bending apparatus for rotary cutters, the combination with means for heating a part of the cutter, clamps for holding the work during the heating period, means for bending the cutter at the heated part and means for holding the work in position after release by the clamps and during the bending operation.

15. In an electric heating and bending apparatus for cutters, the combination with means for heating the cutter at the base of the cutting tooth, means for holding the cutter and a lever having a part adapted to engage a cutting edge and bend it at the heated base.

16. In an electric heating and bending apparatus for cutters, the combination with current supplying electrodes or blocks, means for positioning the cutter on said blocks and means for engaging and bending at the heated part a cutting edge of said cutter.

17. In an electric heating and bending apparatus for cutters, the combination with current supplying electrodes or blocks, means for positioning the cutter on said blocks and a two-part lever adapted to engage a cutting edge of the cutter and bend it at the heated part.

18. In an electric heating and bending apparatus for cutters, the combination with current supplying electrodes or blocks, means for positioning the cutter on said blocks with the part to be heated spanning the gap therebetween and a bending device comprising a two-part lever movable as a whole to engage an edge of the cutter and but one part moving to bend the edge.

19. In an electric heating and bending apparatus for cutters, the combination with current supplying electrodes or blocks, means for positioning the cutter on said blocks with the part to be heated spanning the gap therebetween and a bending device comprising a two-part lever pivoted as a whole to a fixed support and having part capable of independent movement whereby the lever is bodily movable into engagement with a cutting edge of the cutter and but a part moves to bend the edge as and for the purpose described.

20. In an electric heating and bending apparatus for cutters, the combination with current supplying electrodes or blocks, means for holding the cutter in position on said blocks with the part to be heated spanning the gap therebetween and a jointed lever pivoted as a whole to a fixed support and adapted to swing as a whole to engage a cutting edge of the cutter and then turn about the joint to bend said edge with respect to the body of the cutter.

21. In an electric heating and bending apparatus for cutters, the combination with current supplying blocks or electrodes, clamps for pressing the cutter on said electrodes with the part to be heated spanning the gap therebetween, a pawl device for holding the cutter in position after release of the clamps and a lever adapted to engage and bend a cutting edge with relation to the body of the cutter.

22. In an electric heating and bending device for rotary cutters, the combination with current supplying electrodes or blocks upon which the cutter seats with the part to be heated spanning the gap therebetween, a centering device for the cutter, means for holding said cutter in position on said blocks and a lever adapted to engage and bend a cutting edge of the cutter in relation to the body thereof.

23. In an electric heating and bending device for rotary cutters, the combination with current supplying electrodes or blocks upon which the cutter seats with the part to be heated spanning the gap therebetween, a centering device for the cutter, a pawl device for positioning the cutter annularly and a lever adapted to engage and bend a cutting edge of the cutter in relation to the body thereof.

24. In an electric heating and bending device for rotary cutters, the combination with current supplying electrodes or blocks upon which the cutter seats with the part to be heated spanning the gap therebetween, means for bodily positioning said cutter on said blocks, means for positioning the cutter annularly and holding it in such position and a lever adapted to engage and bend a cutting edge of the cutter in relation to the body thereof.

25. In an electric heating and bending device for rotary cutters, the combination with current supplying electrodes or blocks upon which the cutter seats with the part to be heated spanning the gap therebetween, means for bodily positioning said cutter on said blocks, a pawl for both positioning the cutter annularly and holding it in such position, a lever adapted to engage and bend a cutting edge of the cutter in relation to the body thereof and a pawl device adapted to rotate the cutter about said centering device to bring another part thereof in operative position on said blocks.

26. In an electric heating and bending device for rotary cutters, the combination with current supplying electrodes or blocks upon which the cutter seats with the part to be heated spanning the gap therebetween, a vertical pin reciprocated by a lever and adapted to pass through the cutter and seat in one of said blocks to position the cutter and a two-part lever adapted to engage and bend a cutting edge of the cutter in relation to the body thereof.

27. In an electric heating and bending device for rotary cutters, the combination with current supplying blocks or electrodes upon which the cutter seats, means for positioning the cutter on said blocks so that the neck of a cutting tooth spans the gap between the blocks and a lever adapted to engage the edge of a tooth and bend it at the heated neck.

28. In an electric heating and bending device for rotary cutters, the combination with current supplying blocks or electrodes upon which the cutter seats, means for positioning the cutter on said blocks so that the neck of a cutting tooth spans the gap between the blocks, means adapted to engage and bend a cutting tooth of the cutter at the heated neck and a pawl adapted to engage a tooth to rotate the cutter.

29. In an electric heating and bending apparatus for rotary cutters, the combination of means for locally heating the cutter at the neck of the tooth and means for bending the cutter at the heated section.

30. In an electric heating and bending apparatus for rotary cutters, the combination of means for locally heating the cutter at the neck of the tooth and means adapted to engage the edge of a tooth and bend it at the heated section whereby the cutting edge will be distorted outward.

Signed at Lynn, in the county of Essex and State of Mass., this 10th day of July, A. D. 1918.

GEORGE E. BARSTOW.

Witnesses:
W. M. NYE,
R. L. BROAD.